United States Patent [19]

Hosoda et al.

[11] Patent Number: 4,870,390
[45] Date of Patent: Sep. 26, 1989

[54] DEVICE FOR DETECTING LEAKAGE OF PRECHARGED GAS FROM GAS-TYPE ACCUMULATOR

[75] Inventors: Tomohiko Hosoda, Nagoya; Nobuyasu Nakanishi, Toyota; Hirochika Shibata, Kariya; Tadao Saito, Nagoya, all of Japan

[73] Assignees: Toyota Jidosha Kabushiki Kaisha; Aisin Seiki Kabushiki Kaisha, both of Aichi, Japan

[21] Appl. No.: 194,274

[22] Filed: May 16, 1988

[30] Foreign Application Priority Data

May 19, 1987 [JP] Japan .................. 62-122226

[51] Int. Cl.4 .................. B60T 17/18; B60Q 1/00
[52] U.S. Cl. .................. 340/453; 73/39
[58] Field of Search ............ 340/52 C, 52 B; 73/39

[56] References Cited

U.S. PATENT DOCUMENTS 3,662,333 5/1972 Howard et al. ............ 340/52 C
3,997,887 12/1976 Poynter .................. 340/52 C X

FOREIGN PATENT DOCUMENTS 42361 6/1983 Japan .
62-157031 10/1987 Japan .

Primary Examiner—Stewart J. Levy
Assistant Examiner—Joseph W. Roskos
Attorney, Agent, or Firm—Oliff & Berridge

[57] ABSTRACT

A gas leakage detecting device for detecting leakage of a precharged gas from a gas-type accumulator which is connected to a hydraulic pump and which stores a pressurized hydraulic fluid delivered from the pump. The pump is turned on to initiate accumulation of the pressurized fluid in the accumulator when a pressure of the pressurized fluid falls below a lower limit, and turned off when the pressure rises to an upper limit. The detecting device detects an occurrence of leakage of the precharged gas from the accumulator, where a time duration between moments of activation and de-activation of the pump is less than a predetermined reference value.

7 Claims, 3 Drawing Sheets

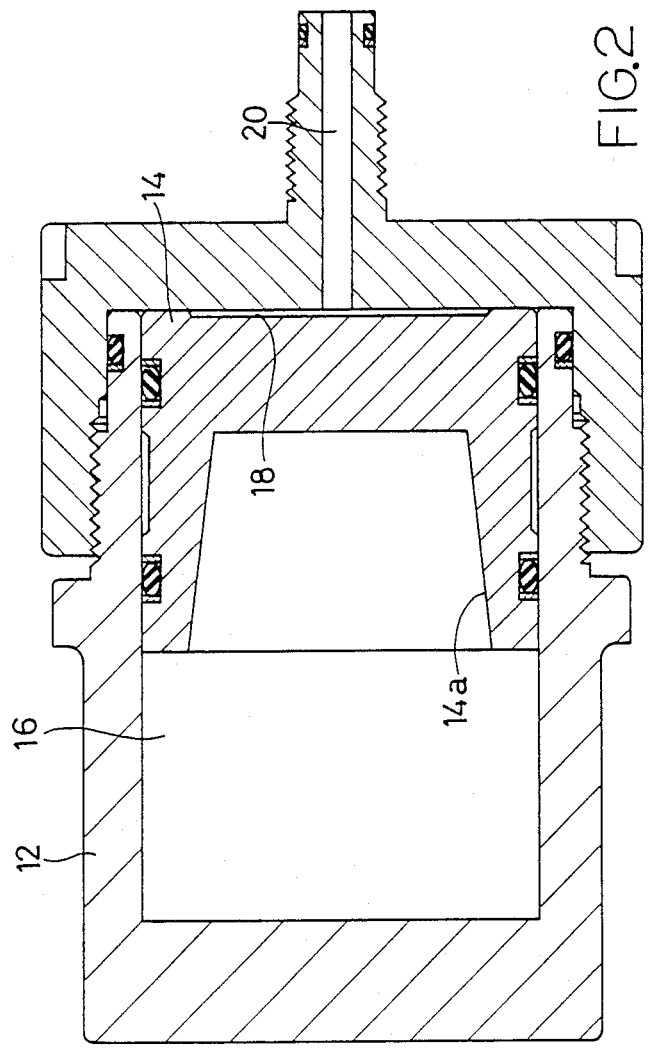

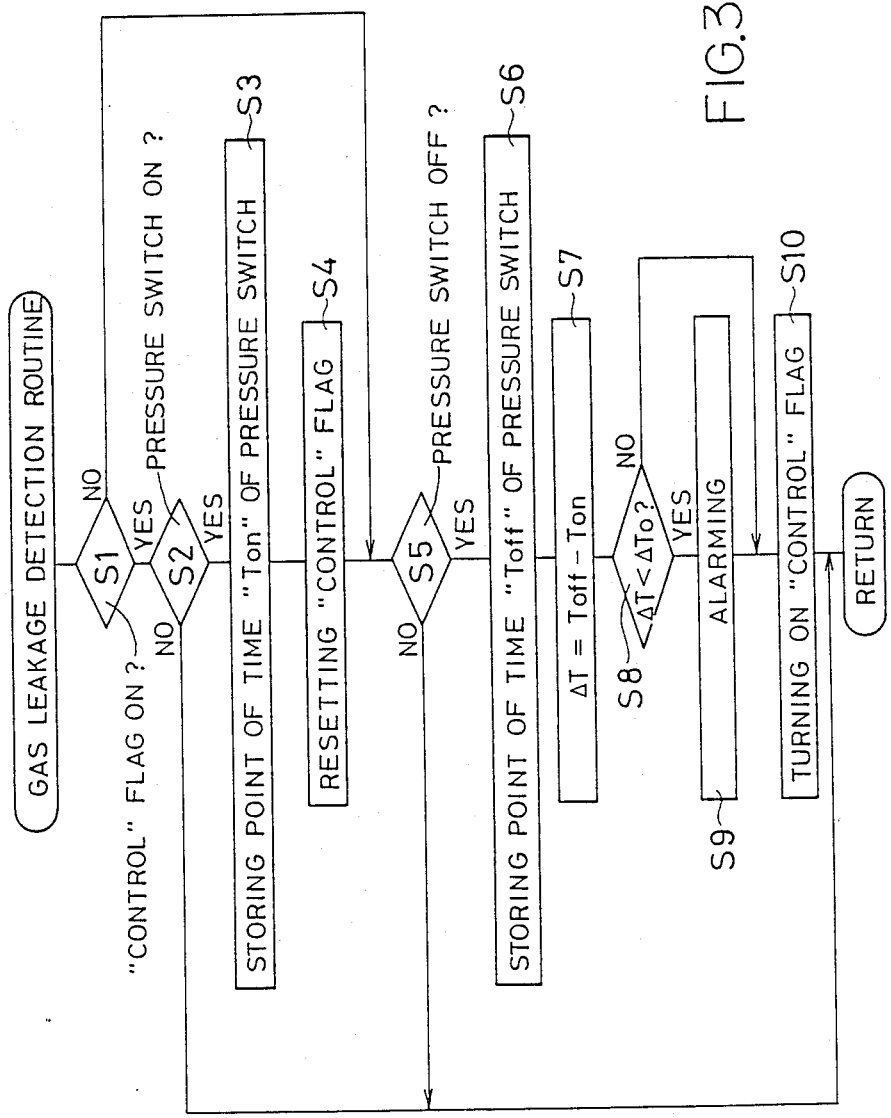

DEVICE FOR DETECTING LEAKAGE OF PRECHARGED GAS FROM GAS-TYPE ACCUMULATOR

BACKGROUND OF THE INVENTION

1. Field of the Invention

The present invention relates to an air or gas type accumulator for storing a hydraulic fluid under pressure within a predetermined range, by utilizing compression and decompression of a gas, and more particularly to a device and a method for detecting leakage of a precharged gas from such a gas type accumulator.

2. Discussion of the Prior Art

One known type of accumulator using a compressible nature of an air or gas is referred to as an air or gas type accumulator. This gas type accumulator stores a pressurized hydraulic fluid or oil under an elastic or spring-like action of a gas. The gas type accumulator can be divided into some subdivisions which include: a piston type wherein an enclosed space within the housing of an accumulator is separated by a floating piston into two chambers, one of which is precharged with a compressed gas, and the other of which stores a hydraulic fluid; and a bag or bladder type wherein a bag or bladder made of a synthetic rubber or other flexible material and precharged with a compressed gas is disposed within a housing, while a pressurized hydraulic fluid is stored in a space defined by the housing and the bladder. These piston and bladder or bag types of accumulator are commonly used.

Such a gas type accumulator cannot store a pressurized hydraulic fluid in a normal manner, if the precharged gas leaks from the accumulator. Therefore, it is necessary to detect an occurrence of the gas leakage. A known method of detecting the leakage of the gas uses a so-called stroke switch, as disclosed in Japanese Utility Model Application No. 61-45313 filed in the name of the assignees of the present application, which had not been laid open at the time the present invention was made. In the disclosed method, a stroke switch is activated by a movement of a piston in a piston type accumulator toward its gas chamber, by a larger amount than usual, where a precharged gas leaks from the gas chamber.

However, such a stroke switch should be sufficiently pressure-resistant and air-tight, since the switch is disposed within the precharged gas chamber or oil accumulator chamber which is exposed to a considerably high pressure. Accordingly, the stroke switch tends to be expensive. Further, the stroke switch is generally installed so as to penetrate the wall of the accumulator housing so that an output signal of the switch is fed to an external device. This arrangement requires a high degree of air tightness between the housing and the switch, and a high degree of pressure resistance of the portion of the housing in which the switch is installed. This results in an additional increase in the cost of manufacture of the accumulator.

SUMMARY OF THE INVENTION

It is therefore an object of the present invention to provide a gas leakage detecting device for a gas type accumulator, without using a detector switch as described above.

The above object can be achieved according to the principle of the present invention, which provides a gas leakage detecting device for detecting leakage of a precharged gas from a gas-type accumulator which is connected to a hydraulic pump and which stores a pressurized hydraulic fluid delivered from the pump, the pump being turned on to initiate accumulation of the pressurized fluid in the accumulator when a pressure of the pressurized fluid falls below a lower limit, and turned off when the pressure rises to an upper limit, the detecting device comprising: time measuring means for measuring a time duration between a moment at which the pump is turned on, and a moment at which the pump is turned off; and determining means for comparing the time duration measured by the time measuring means, with a predetermined reference value, and determining that the leakage of the precharged gas has occurred, if the time duration is less than the reference value.

In the gas leakage detecting device of the present invention constructed as described above, the time duration between the moments of activation and de-activation of the hydraulic pump to supply the accumulator with the pressurized hydraulic fluid is reduced in the event of occurrence of leakage of the precharged gas from the accumulator. While the gas leakage results in an increase in the absolute volume of the hydraulic fluid that can be stored in the accumulator, it is noted that the accumulator is not required to merely store the pressurized fluid, but is required to store the fluid under pressure within a desired range. To this end, the accumulator is provided with a pressure switch to detect the pressure of the hydraulic fluid within the accumulator chamber (hereinafter referred to as "accumulator pressure"), so that the pump is turned on when the detected accumulator pressure falls below a predetermined lower limit, and is turned off when the detected accumulator pressure rises to a predetermined upper limit. If the amount of the precharged gas decreases due to leakage from the gas chamber of the accumulator, a volume of the hydraulic fluid which is supplied to the accumulator during the time duration between the moments of activation and de-activation of the pump is reduced. That is, the above-indicated decrease in the amount of the precharged gas will cause a decrease in the volume of the hydraulic fluid having a pressure within the predetermined range, which is supplied from the accumulator to a hydraulically operated device. In this respect, it is noted that the amount of change in the volume of the gas during compression thereof to raise its pressure from a level equal to the lower limit of the accumulator pressure to a level equal to the upper limit is equal to the above-indicated volume of the fluid supplied under pressure within the predetermined pressure range. However, the gas leakage from the accumulator will cause a decrease in the amount of change in the volume of the gas during the above-indicated compression. Hence, the operating time of the pump is shortened if the gas leakage occurs.

It follows from the above description that the leakage of the gas from the accumulator can be detected, by sensing that the operating time of the pump is shorter than the predetermined reference value.

Thus, the present gas leakage detecting device is capable of detecting leakage of the precharged gas, depending upon the operating time of the pump, without using a conventionally used stroke switch. Accordingly, the present detecting device overcomes all the problems encountered on a prior device using such a stroke switch. In other words, the present detecting device is available at a reduced cost owing to the elimination of the stroke switch, and is completely free of reduction in the strength of the accumulator housing and a possibility of leakage of the gas, which would be derived from the use of the stroke switch.

According to one form of the detecting device of the invention, the timing measuring means and the determining means are constituted by a computer.

The detecting device may further comprise an alarming device which is activated when the measured time duration is less than the reference value.

According to another aspect of the invention, there is provided a hydraulic power source having a function of detecting leakage of a gas, comprising: a gas-type accumulator for storing a pressurized hydraulic fluid under an elastic action of a precharged gas; a hydraulic pump connected to the accumulator to charge the accumulator with the pressurized hydraulic fluid; a pressure detector for sensing a level of the pressurized fluid in the accumulator; a pump control device for turning on the hydraulic pump when the level of the pressurized fluid falls below a lower limit, and turning off the pump when the level rises to an upper limit and; detecting means for detecting an occurrence of leakage of the precharged gas from the accumulator, by detecting that a time duration between a moment at which the pump is turned on and a moment at which the pump is turned off is less than a predetermined reference value.

According to one form of the hydraulic power source of the invention, the gas-type accumulator comprises a piston type accumulator which includes a housing, and a cup-like piston slidably and fluid-tightly fitted in the housing, so as to define two air-tight chambers on opposite sides of the piston. The piston has a recess open in one of the two air-tight chambers, and the above-indicated one air-tight chamber is charged with the precharged gas, while the other air-tight chamber acts as an accumulator chamber for storing a pressurized hydraulic fluid.

Where the accumulator is a piston type as described above, the piston bottoms such that its end face on the side of the gas chamber abuts on the bottom wall of the housing, when the gas leakage occurs. In this respect, the cup-like piston having a recess as indicated above is desirable. In the event of bottoming of the piston, the accumulator chamber is no longer capable of storing the fluid after the bottoming of the piston, whereby the amount of fluid that can be supplied to the accumulator chamber is reduced. Since the delivery of the pump is substantially constant irrespective of the fluid pressure within the accumulator chamber, the operating time of the pump decreases with a decrease in the amount of the fluid that can be stored in the accumulator chamber, with a rise of the fluid pressure from the lower limit to the upper limit.

The hydraulic power source may be used as a hydraulic pressure source for a hydraulically operated brake system for a vehicle. In this case, the accumulator may be connected to a brake cylinder or cylinders via a suitable control valve device, or to a booster disposed between a brake pedal and a master cylinder.

According to a further aspect of the invention, there is provided a method of detecting an occurrence of leakage of a precharged gas from a gas-type accumulator which is connected to a hydraulic pump and which stores a pressurized hydraulic fluid delivered from the pump, the pump being turned on to initiate accumulation of the pressurized fluid in the accumulator when a pressure of the fluid falls below a lower limit, and turned off when the pressure rises to an upper limit, the method being characterized in that the occurrence of leakage of the precharged gas from the accumulator is detected, by detecting a fact that a time duration between a moment at which the pump is turned on and a moment at which the pump is turned off is less than a predetermined reference value.

BRIEF DESCRIPTION OF THE DRAWINGS

The above and other objects, features and advantages of the present invention will become more apparent by reading the following detailed description of a presently preferred embodiment of the invention, when considered in connection with the accompanying drawings, in which:

FIG. 2 is a front elevational view in cross section of a gas type accumulator in the system of FIG. 1;

FIG. 3 is a flow chart illustrating a gas leakage detection routine stored in a read-only memory of a computer included in a control device connected to the power source system of FIG. 1.

DETAILED DESCRIPTION OF THE PREFERRED EMBODIMENT

Figure 1:
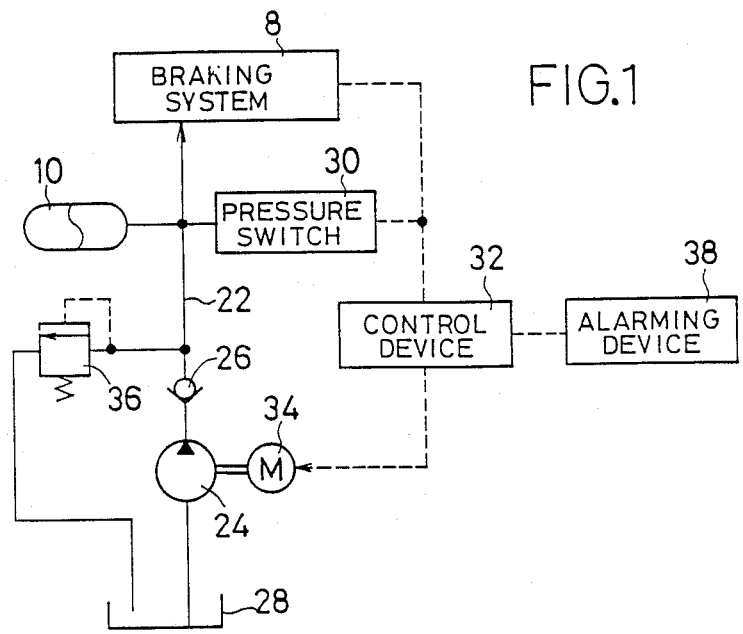
FIG. 1 is a circuit diagram of a hydraulic power source system incorporating one embodiment of a gas leakage detecting device of the present invention.

Referring first to FIG. 1, there is shown a hydraulic power source system connected to a hydraulically operated, anti-lock braking system 8 for an automotive vehicle. The power source system incorporates a detecting device which is adapted to detect leakage of a precharged gas from a gas type accumulator 10 connected to the braking system 8. As indicated in FIG. 2, the accumulator 10 includes a cup-like piston 14 which is slidably and fluid-tightly received in a housing 12, so as to define two air-tight chambers 16, 18 on opposite sides of the piston. The piston 14 has a recess 14a which is open in the air-tight chamber 16 which is charged with a compressed nitrogen gas. The other air-tight chamber 18 communicates with a port 20 through which a pressurized hydraulic brake fluid is supplied, as described below. These air-tight chambers 16 and 18 are hereinafter referred to as a "gas chamber", and an "accumulator chamber", respectively.

The piston type accumulator 10 is connected at its port 20 to a pump passage 22, which in turn is connected to a hydraulic pump 24 via a check valve 26. The pump 24 is driven by a drive motor 34, to pump up the brake fluid in a reservoir 28 and deliver the pressurized fluid to the accumulator 10. The check valve 26 is provided to prevent a flow of the brake fluid in a direction from the accumulator 10 toward the pump 24. The accumulator 10 is provided with a pressure switch 30 connected thereto. This pressure switch 30 is turned on when the pressure in the accumulator chamber 18 falls below a predetermined lower limit, and is turned off when the same pressure rises up to a predetermined upper limit. These lower and upper limits define a desired pressure range of the accumulator 10. The pressure switch is electrically connected to a control device 32, which is connected to the pump drive motor 34. The control device 32 is adapted to control the braking system 8, so as to effect an anti-lock braking pressure regulation, utilizing the accumulator 10 as a hydraulic pressure source. Further, the control device 32 controls the pump drive motor 34, more precisely, commands the drive motor 34 such that the motor is turned on when the pressure switch 30 is turned on, and is turned off when the pressure switch 30 is turned off. Namely, the motor 34 is kept operated while the pressure switch 30 is held on. Reference numeral 36 designates a pressure relief valve, which is operated at a pressure level that is higher by a suitable amount, than the predetermined upper limit of the pressure in the accumulator chamber 18.

The instant power source system, which may be considered as a part of the braking system 8, is provided with an alarming device 38 for the purpose which will be described.

The control device 32 is also adapted to detect an occurrence of leakage of the precharged nitrogen gas from the gas chamber 16 of the accumulator 10, according to the principle of the present invention. The control device 32 uses a computer which includes a ROM (read-only memory) which stores a control program for implementing a gas leakage detection routine illustrated in the flow chart of FIG. 3.

The gas leakage detection routine will be described, by reference to FIG. 3.

Initially, the control flow goes to step S1 to determine whether a "CONTROL" flag is on or not. Since this flag is turned on in an initialization step which is executed upon initial power application to the computer of the control device 32, an affirmative decision (YES) is obtained in step S1, whereby the control flow goes to step S2 to determine whether the pressure switch 30 is on. Normally, the pressure switch 30 is placed in the off state, whereby a negative (NO) decision is obtained in step S2. Consequently, the control skips the following steps S3 through S10. Thus, one cycle (a first cycle) of the gas leakage control routine is completed.

When the pressurized brake fluid stored in the accumulator 10 is supplied to the braking system 8 for an anti-lock braking operation, the pressure in the accumulator chamber 18 may fall below the predetermined lower limit. In this case, the pressure switch 30 is turned on, and the pump drive motor 34 is consequently activated, whereby the pressurized brake fluid is supplied from the pump 24 to the accumulator chamber 18 of the accumulator 10. Therefore, an affirmative decision (YES) is obtained in step S2, and the control flow goes to step S3. In this step S3, a point of time "Ton" at which the pressure switch 30 is turned on is stored in a RAM (random access memory) of the computer of the control device 32. The point of time "Ton" is measured by a timer incorporated in a CPU (central processing unit) of the computer. Then, the control flow goes to step S4 to turn off the "CONTROL" flag. Step S4 is followed by step S5 to determine whether the pressure switch 30 is off. Immediately after the activation of the pressure switch 30, the decision obtained in this step S5 is certainly negative (NO), whereby the following steps S6 through S10 are skipped, and the instant control cycle of the routine is completed.

During repeated executions of steps S1-S5 of the gas leakage detection, the pressure in the accumulator chamber 18 of the accumulator 10 rises to the predetermined upper limit, and the pressure switch 30 is turned off. As a result, the decision in step S5 becomes affirmative (YES), and the control flow goes to step S6 in which a point of time "Toff" at which the switch 30 is turned off is stored in the RAM of the computer. Step S6 is followed by step S7 in which the CPU calculates a time difference $\Delta T$ between the points of time "Toff" and "Ton". Then, the control flow goes to step S8 to determine whether the calculated time difference $\Delta T$ is shorter than a predetermined reference value $\Delta To$. Certainly, the time difference $\Delta T$ is equal to an operating time of the pump drive motor 34, that is, a time duration between the moments at which the pump drive motor 34 is turned on and off. As far as the accumulator is intact, a negative decision (NO) is obtained in step S7, whereby the control flow goes to step S10 to turn on the "CONTROL" flag. Thus, the instant cycle of the routine is completed. In the event that the precharged gas has leaked from the gas chamber 16 of the accumulator 10 by an amount exceeding a certain limit, an affirmative (YES) decision is obtained in step S8, and step S9 is implemented to activate the alarming device 38, thereby informing the occurrence of the gas leakage.

Figure 4:
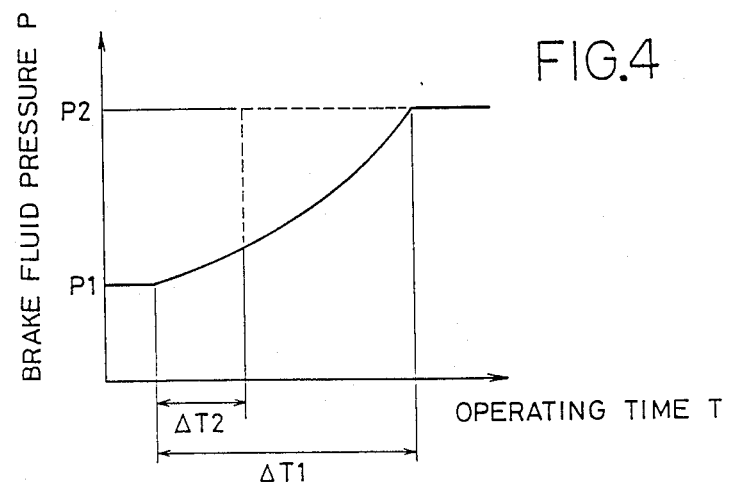
FIG. 4 is a graph explaining a theory of detection of leakage of a gas from the accumulator according to the principle of the present invention.

Referring to FIG. 4, there is illustrated a relationship between the brake fluid pressure P in the accumulator chamber 18 and the operating time T of the pump drive motor 34. Normally, the pump 34 should be operated for a time length of $\Delta T1$ in order to raise the pressure P from the lower limit P1 to the upper limit P2. In the event of a gas leakage, the piston 14 is moved toward the gas chamber 16 as the volume of the gas leakage increases. As long as the distance of movement of the piston 14 is smaller than a given value, the piston 14 will not bottom at its stroke end before the pressure P in the accumulator chamber 18 reaches the upper limit P2. If the gas leakage volume exceeds the certain limit, the piston 14 bottoms before the pressure P exceeds the upper limit P2. As a result of the bottoming, the pressure P rapidly rises as indicated in dashed line in FIG. 4, whereby the operating time T of the pump drive motor 34 necessary to raise the pressure P up to the upper limit P2 is reduced to $\Delta T2$. If this time length $\Delta T2$ is smaller than the predetermined reference value $\Delta To$, the volume of the brake fluid that can be supplied from the accumulator 10 to the braking system 8, within the pressure range between the lower and upper limits P1 and P2, is smaller than required. Therefore, the alarming device 38 is activated in step S9, to indicate this fact.

In the present specific embodiment of the invention, an occurrence of leakage of the precharged gas from the accumulator 10 is detected upon bottoming of the piston 14. However, it is possible that the leakage occurrence may be detected based on the fact that the time duration or operating time $\Delta T$ of the pump drive motor 34 necessary to raise the fluid pressure P from the lower limit P1 up to the upper limit P2 is less than the predetermined reference value $\Delta To$. According to this arrangement, the principle of the present invention may be practiced for other types of gas or air accumulator, such as bag or bladder type and diaphragm type.

Although the illustrated embodiment is adapted to measure the time duration between the moments of switching between the on and off positions of the pressure switch 30 to detect the operating time of the pump 24, it is possible to directly measure the operating time of the pump 24 or pump drive motor 34. The operating time of the pump 24 may be detected by first resetting the time of the computer upon starting of the pump 24, and detecting a time measured by the timer at the moment when the pump 24 is stopped.

While the present invention has been described in its presently preferred embodiment, it is to be understood that the invention is not limited to the precise details of the illustrated embodiment, but may be embodied with various changes, modifications and improvements, which may occur to those skilled in the art, without departing from the spirit and scope of the present invention defined in the following claims.

What is claimed is:

1. A gas leakage detecting device for detecting leakage of a precharged gas from a gas-type accumulator which is connected to a hydraulic pump and which stores a pressurized hydraulic fluid delivered from said pump, said pump being turned on to initiate accumulation of said pressurized fluid in said accumulator when a pressure of said pressurized fluid falls below a lower limit, and turned off when said pressure rises to an upper limit, said detecting device comprising:

time measuring means for measuring a time duration between a moment at which said pump is turned on, and a moment at which said pump is turned off; and determining means for comparing said time duration measured by said time measuring means, with a predetermined reference value, and determining that leakage of said precharged gas has occurred, if said time duration is less than said reference value.

2. A gas leakage detecting device according to claim 1, wherein said time measuring means and said determining means are constituted by a computer.

3. A gas leakage detecting device according to claim 1, further comprising an alarming device which is activated when said time duration is less than said reference value.

4. A hydraulic power source having a function of detecting leakage of a gas, comprising:

a gas-type accumulator for storing a pressurized hydraulic fluid under an elastic action of a precharged gas;

a hydraulic pump connected to said accumulator to charge said accumulator with said pressurized hydraulic fluid;

a pressure detector for sensing a level of said pressurized fluid in said accumulator;

a pump control device for turning on said hydraulic pump when said level of the pressurized fluid falls below a lower limit, and turning off said pump when said level rises to an upper limit and;

detecting means for detecting an occurrence of leakage of said precharged gas from said accumulator, by detecting that a time duration between a moment at which said pump is turned on and a moment at which said pump is turned off is less than a predetermined reference value.

5. A hydraulic power source according to claim 4, wherein said gas-type accumulator comprises a piston type accumulator which includes a housing, and a cup-like piston slidably and fluid-tightly fitted in said housing, so as to define two air-tight chambers on opposite sides of said piston, said piston having a recess open in one of said two air-tight chambers, said one air-tight chamber being charged with said precharged gas, the other air-tight chamber acting as an accumulator chamber for storing a pressurized hydraulic fluid.

6. A hydraulic power source according to claim 4, wherein said accumulator is connected to a hydraulically operated brake system for a vehicle, and serves as a hydraulic pressure source of said brake system.

7. A method for detecting leakage of a precharged gas from a gas-type accumulator which is connected to a hydraulic pump and which stores a pressurized hydraulic fluid delivered from said pump, the method comprising turning on said pump to initiate accumulation of said pressurized fluid in said accumulator when a pressure of said fluid falls below a lower limit, turning off said pump when said pressure rises to an upper limit, and detecting leakage of said precharged gas from said accumulator by detecting that a time duration between a moment at which said pump is turned on and a moment at which said pump is turned off is less than a predetermined reference value.

* * * * *